Figure 1:
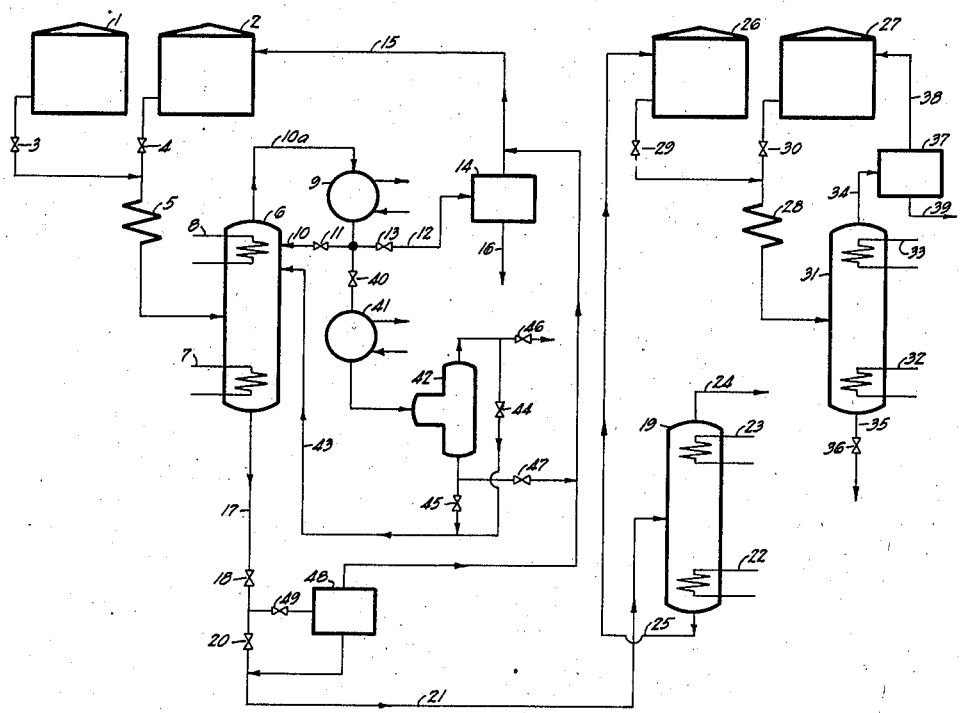

April 12, 1938.  P. J. ROELFSEMA  2,113,965
DISTILLATION PROCESS
Filed July 6, 1937  2 Sheets-Sheet 1

Inventor: Petrus Jurjen Roelfsema
By his Attorney:

April 12, 1938.  P. J. ROELFSEMA  2,113,965
DISTILLATION PROCESS
Filed July 6, 1937  2 Sheets-Sheet 2

Inventor: Petrus Jurjen Roelfsema
By his Attorney:

Patented Apr. 12, 1938

2,113,965

UNITED STATES PATENT OFFICE 2,113,965

DISTILLATION PROCESS

Petrus Jurjen Roelfsema, Long Beach, Calif., assignor to Shell Development Company, San Francisco, Calif., a corporation of Delaware Application July 6, 1937, Serial No. 152,045

25 Claims. (Cl. 196—13)

This invention relates to an improved distillation process for separating liquid solutions or mixtures of two or more groups of physically and/or chemically related or similar substances into their component groups. The present application is a continuation-in-part of my application Serial No. 48,861, filed November 8, 1935.

It has already been proposed to employ separating agents to aid in the separation of certain mixtures which cannot be separated by normal fractionating method, for the reasons that they contain substances which have the same or almost the same vapor pressures, or which form azeotropic mixtures. For example, Brame and Hunter, in the Journal of the Institution of Petroleum Technologists, vol. 13, (1927) page 794, et seq., propose the separation of a mixture of cyclohexane and benzene by distilling it in the presence of ethylene-chlorhydrin, whereby the cyclohexane is caused to distill off and the benzene is concentrated in the residue.

However, many of industrial materials, which it is often desirable to separate into groups of components, are complex mixtures of chemically different groups of substances, some or all groups being mixtures of many various individual compounds of the same type, having wide boiling temperature ranges. While it is impossible in such cases to effect the separation into several narrow groups of similar compounds by any single treatment, it is an object of the present invention to provide a convenient method for directly separating such relatively wide boiling range mixtures into several groups of similar compounds without first distilling the mixture into relatively narrow fractions of the range required for subjecting the fraction to a single distilling operation of the type described by Brame and Hunter.

Briefly, when used to separate, for instance, a mixture of two groups of substances A and B, each consisting of a large number of individual compounds and each boiling throughout approximately the same boiling range, into, say, four portions: low-boiling A, high-boiling A, low-boiling B, and high-boiling B, the process of my invention consists of:

(1) Distilling the mixture in the presence of a separating agent, such as a preferential solvent for one group of substances, say, B, said agent being selected so that its vapor pressure and solvent characteristics would cause it to distill together with all of or with only the lower-boiling members of the group A, leaving all or a part of the members of the group B of boiling points corresponding to the distilled member of the group A undistilled. The undistilled portion may also include higher-boiling components of both groups, together with the high-boiling components of the mixture. By a preferential solvent for B is meant a solvent possessing such characteristics that the distribution ratio between the solvent and the mixture being treated is greater for B than for A when a mixture of all three components is brought to a temperature which is low enough to cause the system to separate into two liquid phases. However, other substances which do not form two layers when commingled with the mixture, but which have a preferential solvent affinity for B, and therefore act to cause the component A to be distilled over at lower temperatures than the component B when distilled with the mixture being treated, may also be employed. The designation "separating agent of the type of preferential solvents" is in the present specification and claims used to include both of these types of separating agents. While any preferential solvent for B would cause, when distilled from a mixture of equally volatile A and B, the distillation of A in preference to B, the boiling temperature of the solvent plus A being lower than the initial boiling temperature of the solvent-free mixture, it is preferable, in order to obtain relatively easily a substantial yield of A in the distillate, to use a solvent which boils within or near the boiling range of components A to be distilled from the mixture.

(2) Either or both distillation products from the foregoing step are distilled in the absence of selective solvent to produce second distillation products. For example, the first distillation residue, consisting of low-boiling B's and high-boiling components of the mixture, may then be distilled in the absence of a selective solvent to distill off low-boiling component B, which may have a boiling range corresponding to that of the already separated low-boiling A's. Alternatively, or in addition, the first distillate from the first distillation is freed from the separating agent by any suitable means, such as extraction, or chilling and causing the formation of liquid phases which may be decanted, and the solvent-free portion is distilled to produce a distillation residue which contains a concentrate of the highest boiling members of component A contained in said first distillate, which may have a boiling range corresponding to that of members of group B contained in the first distillation residue.

(3) One or more of the distillation products of the second distillation step or steps is then distilled in the presence of a separating agent, to produce third distillation products. Preferably, when the second distillation is applied to the first distillation residue, the third distillation is applied to the second distillation residue, and when the second distillation is applied to the first distillate, the third distillation is applied to the second distillate. For example, the residue produced by the second distillation of the first distillation residue, consisting of the high-boiling A's and B's, may then be distilled in a manner similar to the first distillation, in the presence of the same or of another separating agent to produce a third overhead product containing substantially only high-boiling A's together with the separating agent and a third bottom product. If the second bottom product has a sufficiently narrow boiling range, this third distillation can be conducted so as to produce a third bottom product substantially free of the members of group A, and at the same time a distillate substantially free from members of the group B. If not, the third bottom product may contain both A and B, and may be further distilled in successive distillations. Thus, this invention provides a method whereby a sharp separation of at least two groups of substances boiling within coinciding boiling ranges can be effected, or their concentrates, can be produced, by two alternating series of distillations: one series of distillations carried out in the presence of a separating agent and another series without such a solvent.

The nature of the invention may be more fully understood from the drawings, which will be described with reference to a process for separating a mixture of paraffinic hydrocarbons (group A) and aromatic hydrocarbons (group B) in a continuous process, although my invention may be applied to the treatment of many other types of mixtures and may be practiced in batch or discontinuous operations as well.

Thus, hydrocarbon mixtures, such as gasoline, kerosene, Diesel fuel, and other distillates, may contain several or all of the following types of hydrocarbons, for which separating agents of the type of preferential solvents have different degrees of affinity: straight-chain and branched-chain paraffines and olefines, alkylated and un-alkylated naphthenes and aromatics, both mono- and poly-cyclic, and partially hydrogenated aromatics. In addition to these hydrocarbons, many distillates contain non-hydrocarbon compounds, such as sulfur-containing compounds. One or more of these types of compounds for which the separating agent has the lowest affinity may be regarded as the group A, while one or more of the types for which the separating agent has the greatest affinity may be regarded as the group B, all of the constituents of the initial mixture being thereby classified in one of these groups when operating to produce but two types of products. When operating to produce more than two types of products, the initial mixture is separated into more than two groups of substances, all of which may be hydrocarbons, although in certain cases, one or more of these groups may consist mainly of non-hydrocarbons, as explained more fully hereinafter in connection with Figures 2 and 3.

Figure 2:
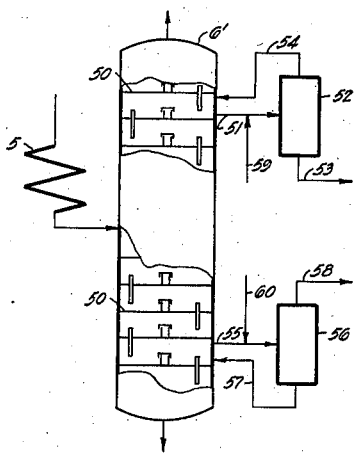
Figure 3:
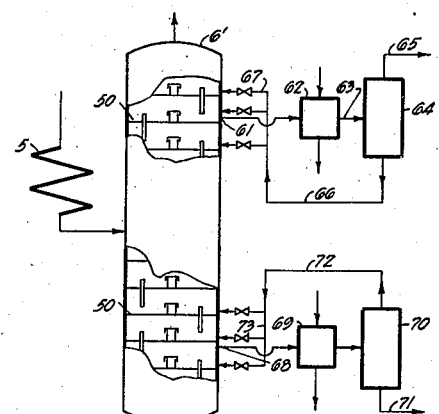
Figure 4:
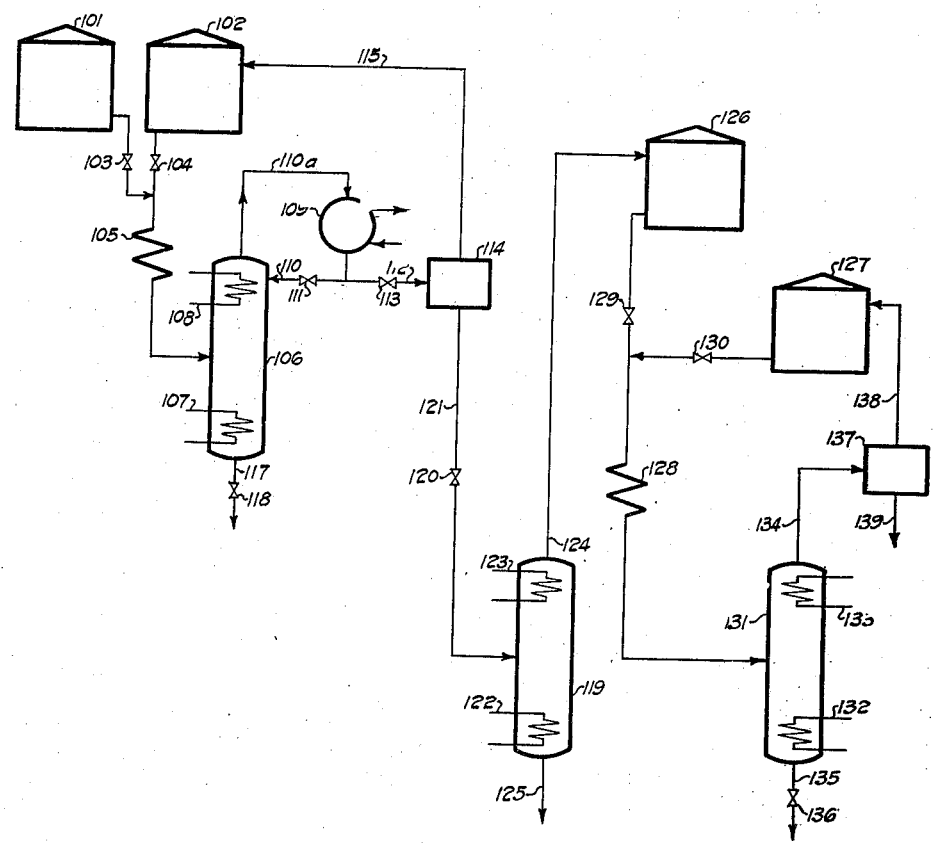

In the drawings, Figure 1 is a schematic flow diagram of one embodiment of my process for separating a mixture into two groups of consecutive fractions; Figures 2 and 3 are similar diagrams, partly in section, of two specific forms of portions of apparatus shown in Figure 1, suitable for carrying out modified embodiments of the invention; and Figure 4 is a schematic flow diagram of a second embodiment of my process.

Referring particularly to Figure 1, a hydrocarbon mixture to be separated, such as a kerosene distillate, and a separating agent, such as aniline, are fed from sources 1 and 2 through valves 3 and 4, respectively, into a mixer 5 and a fractionating column 6, provided with a reboiler 7, and with the necessary contact means, such as bubble-plates or packing, for effecting fractional distillation. The reflux in the column may be produced and controlled by means of a partial condenser 8, located near the top of the column, or by a separate condenser 9 connected with the top of the column by a vapor conduit 10a, a reflux line 10, provided with a manually or thermostatically operated valve 11. The top product may be taken off through a conduit 12 and valve 13, and introduced into a separating apparatus 14, where the aniline is separated from the low boiling paraffinic hydrocarbons, and returned to the tank 2 through a conduit 15, the hydrocarbons being withdrawn at 16.

The apparatus 14 may consist of a chilling device and a settling tank, wherein the aniline and paraffinic hydrocarbons are allowed to stratify. If the hydrocarbon layer contains appreciable quantities of the separating agent, as when the temperature is not low enough to insure substantially complete separation, or when a less immiscible separating agent is employed, the product withdrawn at 16 may be further fractionated by washing, freezing, or distillation to separate the last traces of the agent from the hydrocarbons. Alternatively, the apparatus 14 may be an extraction unit, wherein the mixture is washed with water or with a similar liquid, which is either less miscible with the desired product or which can be more readily separated from it by distillation.

The column 6 may be operated at any desired pressure, either at, above, or below atmospheric. The temperature and/or the pressure is preferably regulated so that the overhead product contains substantially no substances of group B. The degree to which this is accomplished depends upon the degree of rectification which is effected by the column, and it is understood that my invention is not restricted to processes which produce an overhead product which is completely free from members of group B. Moreover, in certain mixtures the overhead mixture in the column 6 may be a ternary or higher azeotrope containing certain amounts of substances of group B. I prefer to select the separating agent so as to produce an overhead mixture which is free from azeotropes containing members of group B, or which contain azeotropes which contain the components of B in minor proportions; but my invention is not restricted to such a choice of separating agents, inasmuch as it is possible to effect a complete separation of these complex overhead mixtures by operating in accordance with the process described and claimed in my copending application, Serial No. 12,007, filed March 30, 1935.

The bottom product from the column 6, which contains substantially all of the aromatics (i. e., the members of group B) and the higher boiling paraffins (i. e., the higher boiling members of group A) is withdrawn at 17, the rate of withdrawal being regulated by a valve 18, which may be automatically controlled. The process, as described up to this point, constitutes the first stage of this embodiment of my process.

The second stage of the process comprises the operations described herein with reference to the distilling columns 19 and 31. My process may comprise any desired number of such second stages, in addition to the first stage; or, if desired, the process may be ended after the distillation in the apparatus 19. In each of these successive stages the bottom product from the preceding stage, such as that from the outlet 17, is introduced into a fractionating column 19 through a valve 20 and a conduit 21. The column 19 may be similar to the column 6, in that it is provided with a heating coil 22, a partial condenser 23, or an external reflux condenser, not shown, as well as with the usual bubble plates or packing. In composition in the conduit 21 should be substantially or completely free from aniline or from any other separating agent which is introduced from the tank 2. In the absence of the separating agent, the aromatics or a concentrate thereof, which normally boil below the paraffins which are present in the feed mixture in the conduit 21 can be distilled off in the column 19, as an overhead product, and withdrawn at 24, while the heavier paraffins and aromatics are withdrawn at 25, as a bottom product, and introduced into a surge tank 26. The column 19 is preferably operated so that substantially no paraffins are removed with the overhead product, although the degree to which this condition is achieved may vary depending upon the efficiency of the column. The nature of the column and the resulting degree of rectification which will be obtained in any situation will be dictated by economic considerations, and it is pointed out that my invention is not restricted to a process in which only a complete separation between the groups A and B is effected.

The hydrocarbon mixture from the tank 26 and a separating agent from the tank 27 are introduced into a mixer 28 through valves 29 and 30, and the resulting mixture is distilled in a fractionating column 31, which may be similar to the column 6, and provided with suitable contact means, not shown, a reboiler 32, and a partial condenser 33, or with an external reflux condenser of the type shown in connection with the column 6. The separating agent in the tank 27 may be the same as that which was employed in the first stage, or may be another agent which may boil either above or below said first agent. I have found that if an agent having a high vapor pressure is chosen as the separating agent, rectification in the columns 6 and 31 is easier, but the overhead mixture will generally contain a reduced concentration of the components of group A, so that larger amounts of the separating agent must be introduced into the column in order to permit the desired quantities of these components to be distilled over in the top product. On the other hand, although it is often possible to use an agent which has a boiling point well above the initial boiling point of the mixture being fractionated, and thereby use lesser quantities of this liquid, often it is much more difficult to fractionate such a mixture, thereby often necessitating the use of a higher fractionating column and/or a higher reflux ratio. I have found that the best results are often obtained by employing in each stage of the process a separating agent which has a boiling point which is near the initial boiling point of the mixture being fractionated. Thus, I prefer to employ as a separating agent, a liquid selective solvent boiling within the range of temperatures: 25° below the initial boiling point of the mixture to the end point of the fraction distilled in the overhead, although I prefer to employ a separating agent with a boiling point not more than 10° higher than the initial boiling point of the mixture. It will be seen that this mode of selecting the separating agent will involve the use of a higher boiling separating agent at each successive stage of the process. In the process under consideration, in which aniline was employed in the first stage, quinoline or furfuryl acetone may, for example, be supplied from the tank 27.

If the hydrocarbon mixture in the tank 26 has a sufficiently narrow boiling range, say not in excess of about 40° to 60° C., the column 31 may be operated to remove continuously all of the paraffinic hydrocarbons, or all those paraffinic hydrocarbons which it is desired to remove from the bottom product by the operation of the process in the overhead product, which is withdrawn at 34, and to withdraw substantially all of the high-boiling aromatic hydrocarbons in the bottom product at 35, the rate of efflux being regulated by a valve 36. The top product may be further treated in the apparatus 37, which may be similar to the apparatus 14, described above, and from which the separating agent is returned to the tank 27 through a conduit 38, and the high-boiling paraffins are withdrawn at 39.

The operations involving the first redistillations in the column 19 in the absence of the separating agent, or with substantially reduced amounts of a separating agent, and the second redistillation in the column 31 with an additional quantity of a separating agent constitute the second stage of my process. Any number of stages, similar to the described second stage may be employed, depending upon: the width of the boiling range of the initial mixture in the tank 1, the solvent characteristics of the components of the mixture and the polar separating agent, the volatility of the separating agent selected, and the width of the fractions separated at each stage. For example, if the mixture in the tank 26 has too wide a boiling range to permit the effective separation of all of the paraffins in the overhead product from the column 31, this column may be operated, in the manner described above in connection with column 6, to produce a top product containing only a portion of the paraffins contained in the said mixture, thereby producing a bottom product at 35 which contains both paraffins and aromatics. This bottom product can then be fractionated in one or more additional stages, each similar to the second stage, until the desired separation between paraffins and aromatics has been effected. Or, if desired, the column 31 may be operated in the manner described for column 106 of Figure 4.

As was pointed out above, the material which is fractionated in the first column of each stage after the first stage should contain little or no separating agent. This condition may be established in various ways. According to my preferred mode of operation, I operate the column 6, so that the bottom product withdrawn at 17 will be substantially free of the separating agent. This mode of operation, subsequently described, may be applied to the succeeding columns or distillation steps in which a mixture is fractionated in the presence of a polar separating agent, although it is not necessary that the bottom product from the last of these operations be free of the separating agent.

To produce a bottom product at 17 which is free from the separating agent, and at the same time remove the desired fraction of paraffins in the top product introduced into the apparatus 14, the ratio of the separating agent to those paraffins which are in the said top product must be the same as in the feed introduced into the column 6. This may be effected by controlling the valves 3 and 4 to introduce these materials into the mixer 5 and column 6 in the ratio in which they occur in the natural overhead product, i. e. the vapors passing through the vapor conduit 10a; the overhead product will often but need not be an azeotrope or a pseudo-azeotrope of more or less fixed composition.

Alternatively, the top product may be produced by closing the valve 13, opening valve 40 and passing a portion of the overhead mixture through a chiller 41, and permitting the chilled mixture to separate into two liquid phases in a phase separator 42. A portion of one of these phases, or, if desired, a mixture of both phases, is returned to the column 6 through a conduit 43, either together with the reflux condensate at 10, or separately at any desired point in the column, as shown, the quantity and composition being controlled by the valves 44 and 45, so that the portion withdrawn from the separator 42 through valves 46 and 47 contains the separating agent and the distilled paraffinic fraction in the same ratio as these substances occur in the feed mixture. It should be noted that the stated relationship concerns only those paraffins which are removed in the overhead mixture, and not the total paraffin content of the feed mixture. The aggregate of the products withdrawn through the valves 46 and 47 is regarded as the top product of the column 6. The product withdrawn through the valve 46 will often be substantially free of the separating agent, and may be withdrawn as a product of the process, thereby eliminating the apparatus 14. If it contains substantial quantities of this agent it may be further fractionated or otherwise treated in the apparatus 14. The phase withdrawn at 47 will often consist substantially only of the separating agent and may be returned directly to the tank 2, as shown, or may be further treated, as desired. If the density of the separating agent is less that of the desired overhead product, the polar liquid will be recovered as the upper phase at 46, instead of at 47.

It should be noted that the desired composition relationship may be established by analyzing the feed mixture and the top product; but in practice, this will often be empirically determined by manipulating the valves 3 and 4, and/or the valves 44, 45, 46, and 47, so as to produce the desired bottom product. Moreover, the composition of the bottom product can be controlled by regulating the above valves to maintain a constant temperature at a selected point of the column, or in accordance with the method described in the patent to Kramer, No. 2,022,809. These methods of controlling the composition are more fully described in my copending application, Serial No. 12,007, to which reference may be had for further details.

According to another mode of operation, the bottom product at 17 may be produced free from the separating agent by regulating the temperatures and/or the pressures in the column 6 so as to distill over all of the separating agent. The method necessitates only an approximate adjustment of the valves 3 and 4 in accordance with the rule given above, and may often cause the overhead product to contain appreciable quantities of aromatics. In processes in which complete separation is not essential this mode of operation may, however, be permissible.

According to still another mode of operation the bottom product at 17 may contain appreciable quantities of the polar separating agent, which may be removed therefrom by passing the bottom product through an apparatus 48, by closing the valve 20 and opening the valve 49. The apparatus 48 may be similar to the apparatus 14, described above, and designed to remove the separating agent from the bottom product.

It will, therefore, be seen that my invention is not restricted to any particular mode of producing a bottom product which is free or substantially free from the separating agent, but that my invention may be practiced in connection with any suitable expedient for producing the desired composition for introduction into the column 19. Any of the above modes of operation may be applied to the second redistillation step of any or all of the succeeding stages, as, for example, to the column 31.

While I have described the invention with reference to a continuous process, employing a separate piece of apparatus for each successive operation, the invention may be practiced in a single distillation column, as will be apparent from the following example:

Six parts by volume of a 195°–240° C. fraction of a kerosene distillate having a refractive index $n_D^{20}$ of 1.462 were mixed with five parts by volume of o-cresol (B. P. 181° C.), charged into a still, and distilled at atmospheric pressure. After the first three fractions consisting of the cresol and low-boiling, low-refractive index hydrocarbons were distilled (fractions 1–3 in the following table), the still residue was substantially free from o-cresol. This still residue was further distilled to yield a low boiling hydrocarbon fraction of high refractive index (fraction 4). This distillation was continued until all of the low boiling hydrocarbons of high refractive index were recovered in the overhead, as indicated by the refractive index of the overhead vapors. To regulate this distillation the refractive indices of successive portions of the overhead were determined, and the distillation was stopped as soon as the refractive index of the overhead product began to decrease. In this distillation the maximum refractive index of 1.477 was reached when the still temperature reached approximately 212° C., and the distillation was stopped at 220° C. The residue was then allowed to cool slightly, was mixed with 1.4 times its volume of p-chlorophenol (B. P. 217° C.) and was then distilled to yield three fractions containing high-boiling low-refractive index hydrocarbons (fractions 5–7) at which point the p-chlorophenol was substantially removed from the residue. The residue was further fractionated into fractions 8 and 9.

| Hydrocarbon fraction | Percent of original distillate | Still-head temperature range ° C. | Refractive index of fraction $n_D^{20}$ |
|---|---|---|---|
| *Distillation with o-cresol* | | | |
| 1 | 10 | 180–185 | 1.442 |
| 2 | 15 | 185–188 | 1.445 |
| 3 | 13 | 188–191 | 1.451 |
| *Distillation without solvent* | | | |
| 4 | 10 | 191–220 | 1.474 |
| *Distillation with p-chlorophenol* | | | |
| 5 | 15 | 202–210 | 1.447 |
| 6 | 15 | 210–212 | 1.450 |
| 7 | 15 | 212–215 | 1.457 |
| *Distillation without solvent* | | | |
| 8 | 4 | 215–220 | 1.484 |
| 9 | 3 | 220–240 | 1.505 |

Comparing this process with that described heretofore with reference to Figure 1 of the drawings, it should be noted that the fractions 1 to 3 correspond to the product withdrawn at 16 (or through the valve 46); fraction 4 to that withdrawn at 24; fractions 5 to 7 to that withdrawn at 39; and fractions 8 and 9 to that withdrawn at 35. Although these four products have, in this example, been fractionated into narrower cuts, it is apparent that this was done merely to show the exact course of the process, and that this would not always be a necessary part of my process. It should also be noted that the fractions 1 to 3 contain the low-refractive index hydrocarbons which have normal boiling temperatures between 195° and 220° C., while fractions 5 to 7 contain low-refractive index hydrocarbons which have normal boiling temperatures between 220° and 240° C., so that, by combining fractions 1-3 and 5-7, a full-range aromatic-free kerosene can be obtained, while fractions 4, 8, and 9 represent aromatic concentrates, which may be used, for instance, as aromatic diluents in solvent extractions of lubricating oils.

My process may also be applied to operations in which more than two types of products are produced, by providing the fractional distillation column with side strippers. Columns of this type may be employed in any or all stages of my process in place of the columns described above.

One form of this type of column is shown in Figure 2, where 6' represents a fractionating column, which may be similar to the column 6 of Figure 1, and may be provided with heating and condensing and/or reflux means, and provided with the usual bubble plates 50, as shown, or with any other means for effecting contact between the rising vapors and descending reflux condensate. The feed mixture is introduced through the mixer 5, and the top and bottom products are withdrawn at the opposite ends of the column, as described heretofore. At an intermediate point of the column, as, for example, at 51, a portion of the distillation mixture is withdrawn and further distilled in a side stripper 52, which may be equipped with a re-boiler, and a reflux condenser, to produce two products of different boiling ranges, one of which is withdrawn as a product, as at 53, and the other is returned to the column 6' through the conduit 54, at any convenient point, preferably to a plate at which the composition is most nearly like that of the returned product. While I may withdraw either the vapors or the condensate from the column at 51, and may take off either the top product or the bottom product from the side stripper, depending upon the nature of the side product desired, I prefer, when removing a side stream from a point above the feed intake, to remove a condensate, and to return to the column the lower boiling portion from the side stripper.

One or more of such side streams may be removed from the column 6'. When removing a side stream from a point below the feed intake, as, for example, at 55, I prefer to remove the vapors, and to return to the column the bottom product from the side stripper 56, as through a conduit 57, and withdraw as the intermediate product the top product, produced at 58, although this choice of mixtures is not vital.

If desired, additional quantities of the same or a different separating agent may be introduced through the conduits 59 or 60, thereby improving the fractionation in the side strippers 52 and 56.

I may also operate the side strippers in the absence of the selective solvent, as shown in Figure 3, in which 6' is a fractionating column, similar to that of Figure 2. The side stream withdrawn from the column 6' at 61 is passed through a separating unit 62, in which the separating agent is removed from the side stream. This unit 62 may be similar to the separators 14 and 48, in which the separating agent is removed by chilling and stratification, or by washing with a suitable solvent, etc., whereby a side stream entirely or substantially free from the separating agent is produced. This product is introduced through a conduit 63 into a side stripper 64, where it is distilled to produce two products, one of which is withdrawn at 65 as a side product, and the other is returned to the column 6' through a conduit 66 and a manifold 67, the returned product being preferably returned to a point at which the composition of the distillation mixture is similar to that of the returned portion. While either vapors or condensate may be withdrawn at 61, and either the top or bottom product withdrawn from the side stripper, I prefer, when separating a side stream from a point in the column 6' above the feed intake, to separate a condensate, and to withdraw the top product of the side stripper as a side product, and to return the bottom product to the column 6'.

One or more of such side streams may be withdrawn from the column 6'. When removing a side stream from a point below the feed intake, as, for example, at 68, I prefer to remove vapors, which may be freed from the separating agent in the apparatus 69 as described above for the apparatus 62, and distilled in the side stripper 70. In this case, I prefer to withdraw the bottom product from the side stripper 70 as a side product at 71, and to return the more volatile portion through a conduit 73 and manifold 74. My process is not, however, limited to the choice of products indicated above for the preferred mode of operation.

The above described embodiment may be employed to produce several hydrocarbon products. Often, when fractionating a mixture, like gasoline or kerosene, which may be regarded as consisting of three groups of components of progressively greater solubilities in selective solvents, the order being, for instance, paraffinic hydrocarbons, non-paraffinic hydrocarbons, and sulfur-bearing substances, particularly of thiophene series, the fractionation in the column 6' may be so adjusted, by providing a sufficient reflux, and the necessary amount of solvent, and a column of proper height, that the most soluble (sulfur) components are concentrated at the bottom product, substantially all components of intermediate solubilities (non-paraffines) are removed as a side stream product (through either conduit 53, or 58, or 65, or 71), and the low-boiling members of the least soluble group of substances are produced at the top of the column 6'. In this case, this side stream product is often used as the feed to the column 19 and not the bottom product of column 6.

In the form of the invention illustrated in Figure 4, the distillate produced by the distillation in the presence of separating agent is further distilled. In this figure, the mixture to be separated and the separating agent are fed from sources 101 and 102 through valves 103 and 104, respectively, into a mixer 105 and a fractionating column 106, provided with reboiler 107, partial condenser 108, condenser 109, vapor conduit 110a, reflux line 110 and reflux valve 111, top product line 112 and valve 113, separating apparatus 114, solvent return line 115, and bottom product draw off line 117 and valve 118, all similar to the apparatus heretofore described in connection with Figure 1.

The column 106 may be operated in any manner, such as one of those described for the column 6 or 6' in Figure 1, 2, or 3, and may, if desired, be provided with a chilling unit and phase separator similar to the units 41 and 42 of Figure 1, either in place of, or in addition to the separator 114. In this embodiment of the invention the temperature and/or pressure are regulated so that the first top product, flowing through the conduit 112 contains an appreciable quantity of members of the group B. Due to the effect of the separating agent, this first top product will contain members of group A boiling below the members of group B contained therein.

In the second stage of my process the first top product, after the removal of all or substantially all of the separating agent, is introduced through a valve 120 and a conduit 121, into a fractionating column 119, which may be similar to the column 106, and equipped with a heating coil 122 and a partial condenser 123. In the absence of the separating agent the members of group A, such as paraffins, or a concentrate thereof, which normally boil above the members of group B, such as aromatics, which are present in the first top product fed through the conduit 121 are obtained in the second distillation residue, and withdrawn at 125, while the lighter members of both groups (or only of group B, when no lighter members of group A are present) are withdrawn at 124 as a second top product, and may be withdrawn as a product, or introduced into a surge tank 126. The column 119 is preferably operated so that substantially no members of the component B are present in the bottom product, although the degree to which condition is achieved may vary depending upon the efficiency of the column, and upon the purity of the product desired, my invention not being restricted to the formation of a bottom product from the column 119 which contains only A.

The second top product in the tank 126, together with a separating agent from the tank 127, (which may be the same as that in the tank 102, but is preferably of a lower boiling point, the relation of its boiling point to the boiling range of the mixture being desirably that disclosed above in connection with the separating agent from the source 27 in Figure 1) are introduced into a mixer 128 through valves 129 and 130, and the resulting mixture is distilled in a fractionating column 131, which may be similar to the column 6 of Figure 1, and provided with suitable contact means, not shown, a reboiler 132, and a partial condenser 133, or with an external reflux condenser of the type shown with column 6 in Figure 1. If the mixture in the tank 126 has a sufficiently narrow boiling range, say not in excess of 40° to 60° C., the column 131 may be operated to remove continuously all of the members of group B, such as the aromatic hydrocarbons, or all of those which it is desired to remove from the ultimate top product in the third bottom product, which is withdrawn at 135, the rate of efflux being regulated by a valve 136, and to withdraw substantially all of the members of group A, such as paraffinic hydrocarbons, in the third overhead product at 135. The top product may be further treated in the apparatus 137, which may be similar to the apparatus 14, described in connection with Figure 1, from which the separating agent is returned to storage via the line 138 and the low boiling members of group A are withdrawn at 139.

If either or both of the distillation products from the column 131 contain members of both components, such product may be further separated by any desired additional number of stages. Thus, if the third top product contains both A and B, it may, after the removal of the separating agent, be further distilled in one or more stages comprising a column similar to the column 119 and column similar to the column 131. The third bottom product, if it contains both A and B, may be treated in one or more stages similar to the second stage described in connection with Figure 1, comprising the distillations in the column 19 alone, or both columns 19 and 31.

The bottom product withdrawn at 117 from the column 106 may contain substantially only members of the component B, either with or without separating agent. If, however, it contains both A and B, it may be treated in the manner described above for the bottom product from the column 6 in Figure 1.

The embodiment of the invention illustrated in Figure 4 may be employed to treat any type of mixture, such as mixtures of hydrocarbons, or oils containing one type or several types of hydrocarbons together with sulfur compounds. In the latter case, the column 106 may be operated so as to remove a concentrate of sulfur compounds at 117 as the bottom product, removing the greater portion of the hydrocarbons in the first top product. After the removal of the solvent the latter may be redistilled in the column 119, or treated either in the column 131, or in the column 6 of Figure 1 as an initial mixture.

While I have particularly described my invention with relation to the treatment of hydrocarbons with polar selective solvents as separating agents, it should be noted that my invention may also be applied to other types of separations, and is useful in any situation in which a separating agent which is a preferential solvent for the members of one component or group of components of a mixture is used during the distillation of said mixture, whether the process is operated to produce substantially pure components or not. For example, when separating a mixture of polar substances, or a mixture of a polar substance and a non-polar substance, a hydrocarbon may often be employed as the selective solvent. This invention is, therefore, to be construed broadly to include all forms of "extractive distillation", as described in the first part of this specification. For example, mixtures of fatty oils may be separated from impurities of about the same boiling temperature range by the process of the present invention. Suitable separating agents for effecting the separation of hydrocarbon mixtures will be apparent to those skilled in the art. Among the separating agents which are often not true preferential solvents, in that they are not capable of causing the formation of two layers when mixed with the lighter distillates, but which are included in the designation "separating agents of the type of preferential solvents" are: pyridine, quinaldine, beta-gamma-picoline, alpha-picoline, and refinery nitrogen bases.

As used in the present specification and claims, the term "component" is not restricted to pure compounds or substances, but is used also to designate a group of compounds having generally similar chemical and/or physical properties (other than boiling temperatures) and which it is desired to separate, either partially or entirely. A component is said to be pure when it contains no substances which should be present only in the other component. The initial mixtures which are said to "contain" two components which are to be separated may further contain additional components or substances, and the latter may occur in any or all of the distillation products of the process, depending upon their volatilities and their susceptibility to the separating agent employed.

I claim as my invention:

1. A process for separating a mixture containing a first and a second component, each of said components containing a plurality of substances having different boiling temperatures, and the first component containing substances boiling within the boiling temperature range of the second component, comprising the steps of distilling said mixture in the presence of a separating agent of the type of preferential solvent for members of the second component under conditions to produce a first top product containing the separating agent together with at least the lowest boiling members of the first component, and a first bottom product, and distilling one of said first distillation products substantially in the absence of the separating agent to produce second top and bottom products containing relatively lower and higher boiling substances of the mixture.

2. A process for separating a mixture containing a first and a second component, each of said components containing a plurality of substances having different boiling temperatures, and the first component containing substances boiling within the boiling temperature range of the second component, comprising the steps of distilling said mixture in the presence of a separating agent of the type of a preferential solvent for members of the second component under conditions to produce a first top product containing the separating agent together with a concentrate of the lowest boiling members of the first component boiling within the boiling temperature range of the second component, and a first bottom product, and distilling the first bottom product substantially in the absence of the separating agent to produce a second top product containing a concentrate of the lowest boiling members of the second component contained in said first bottom product and a second bottom product containing higher boiling substances of the mixture.

3. A process for separating a mixture containing a first and a second component, each of said components containing a plurality of substances having different boiling temperatures, and the first component containing substances boiling within the boiling temperature range of the second component, comprising the steps of distilling said mixture in the presence of a separating agent of the type of a preferential solvent for members of the second component under conditions to produce a first top product containing the separating agent together with at least low-boiling members of both components and a first bottom product containing a concentrate of the highest boiling members of the second component boiling within the boiling temperature range of the first component, removing the separating agent from the first top product, and distilling the said first top product substantially in the absence of the separating agent to produce a second bottom product containing a concentrate of the highest boiling members of the first component contained in said first top product, and a second bottom product containing relatively lower boiling substances of the mixture.

4. A process for separating a mixture containing a first and a second component, each of said components containing a plurality of substances having different boiling temperatures, and the first component containing substances boiling within the boiling temperature range of the second component, comprising the steps of distilling said mixture in the presence of a separating agent of the type of a preferential solvent for members of the second component under conditions to produce a first top product containing at least the lowest boiling members of the first component and a first bottom product, distilling one of said first distillation products substantially in the absence of the separating agent to produce second top and bottom products containing relatively lower and higher boiling substances of the mixture, and distilling one of said second distillation products in the presence of a separating agent of the type of a preferential solvent for members of one of said components under conditions to produce third top and bottom products, said third bottom product containing members of the preferentially dissolved component boiling within the boiling temperature range of members of the other component contained in said third top product.

5. A process for separating a mixture containing a first and a second component, each of said components containing a plurality of substances having different boiling temperatures, and the first component containing substances boiling within the boiling temperature range of the second component, comprising the steps of distilling said mixture in the presence of a separating agent of the type of a preferential solvent for members of the second component under conditions to produce a first top product containing a concentrate of the lowest boiling members of the first component boiling within the boiling temperature range of the second component, and a first bottom product, distilling the first bottom product substantially in the absence of the separating agent to produce a second top product containing a concentrate of the lowest boiling members of the second component contained in said first bottom product and a second bottom product containing higher boiling members of both components and distilling the second bottom product in the presence of a separating agent of the type of a preferential solvent for members of one of said components under conditions to produce a third top product containing a concentrate of members of one of said components, and a third bottom product.

6. A process for separating a mixture containing a first and a second component, each of said components containing a plurality of substances having different boiling temperatures, and the first component containing substances boiling within the boiling temperature range of the second component, comprising the steps of distilling said mixture in the presence of a separating agent of the type of a preferential solvent for members of the second component under conditions to produce first top and bottom distillation products, at least one of which contains members of both components, redistilling the first distillation product containing members of both components substantially in the absence of the separating agent to produce second top and bottom distillation products, the second distillation product corresponding to the other first distillation product containing a concentrate of the members of one of the components originally contained in said redistilled first distillation product, and the other second distillation product containing members of both components, and distilling said other second distillation product in the presence of a separating agent of the type of a preferential solvent for members of one of said components under conditions to produce third top and bottom products, said third bottom product containing members of the preferentially dissolved component boiling within the boiling temperature range of members of the other component contained in said third top product.

7. A process for separating a mixture containing a first and a second component, each of said components containing a plurality of substances covering a wide range of boiling temperatures, and the first component containing substances boiling within the boiling temperature range of the second component, comprising the steps of distilling said mixture in the presence of a separating agent of the type of a preferential solvent for members of the second component under conditions to produce a first top product containing the separating agent and at least low boiling members of both components and a first bottom product containing a concentrate of the highest boiling members of the second component boiling within the boiling temperature range of the first component, removing the separating agent from the first top product, distilling the said first top product substantially in the absence of the separating agent to produce a second bottom product containing a concentrate of the highest boiling members of the first component contained in said first top product and a second product containing lower boiling members of both components, and distilling said second product in a third distilling stage in the presence of a separating agent of the type of a preferential solvent for members of the second components under conditions to produce third top and bottom products, said third bottom product containing members of the preferentially dissolved component boiling within the boiling temperature range of members of the other component contained in said third top product, and said third top product containing the separating agent employed in the third distilling stage.

8. A process for separating a mixture containing a first and a second component, each of said components containing a plurality of substances covering a wide range of boiling temperatures, and the first component containing substances boiling within the boiling temperature range of the second component, comprising the steps of distilling said mixture in the presence of a separating agent of the type of a preferential solvent for members of the second component under conditions to produce a first top product consisting of the separating agent and a concentrate of the lowest boiling members of the first component boiling within the boiling temperature range of the second component, and a first bottom product, distilling the first bottom product substantially in the absence of the separating agent to produce a second top product containing a concentrate of the lowest boiling members of the second component contained in said first bottom product and a second bottom product containing higher boiling members of both components, and distilling the second bottom product in the presence of a separating agent of the type of a preferential solvent for the members of the second component present in said second bottom product under conditions to produce a third top product consisting of the separating agent and a concentrate of members of the first component, and a third bottom product.

9. The process according to claim 8, in which the separating agent employed in distilling the second bottom product has a higher boiling temperature than the separating agent employed in distilling the initial mixture.

10. The process according to claim 9, in which the separating agent employed in each distillation has a boiling temperature which is within the range: from 25° C. below to 10° C. above the initial boiling point of the fraction distilled in the respective distilling operation.

11. The process according to claim 9, in which the separating agent employed in each distillation has a boiling temperature which is within the range: from 25° C. below the initial boiling point of the fraction distilled in the respective distilling operation to its end point.

12. A process for separating a mixture containing a first and a second component, each of said components containing a plurality of substances having different boiling temperatures, and the first component containing substances boiling within the boiling temperature range of the second component, comprising a preliminary treatment which comprises distilling the mixture in the presence of a separating agent of the type of a preferential solvent for the members of the second component under conditions to produce a preliminary top product containing a concentrate of the lowest boiling members of the first component boiling within the boiling temperature range of the second component, and a preliminary bottom product, followed by at least one cycle of treatment, each cycle comprising the combination of steps of distilling the bottom product of a preceding distillation treatment substantially in the absence of a separating agent to produce a first top product containing a concentrate of the lowest boiling members of the second component which are present in the bottom product being distilled in the respective cycle, and a first bottom product, and distilling the first bottom product in the presence of a separating agent of the type of a preferential solvent for the members of the second component under conditions to produce a second top product containing a concentrate of members of the first component boiling within the boiling temperature range of the members of the second component contained in the said first bottom product, and a second bottom product, each of the said second top products except that produced in the last cycle of treatment containing a concentrate of only the lowest boiling members of the first component which are present in the bottom product being treated in the respective cycle.

13. The process according to claim 12 in which the separating agent employed in each distillation has a boiling temperature which is within the range: from 25° C. below to 10° C. above the initial boiling point of the mixture being distilled in the respective distilling operation.

14. A process for separating a mixture containing a plurality of components, each of said components containing a plurality of substances having different boiling temperatures, and at least some of the members of each component boiling within the boiling temperature range of the other components, comprising the steps of distilling said mixture in a fractionating zone in the presence of a separating agent of the type of a preferential solvent for the members of a first of said components under conditions to produce a top product consisting of the separating agent and a concentrate of the lowest boiling members of one of said other components boiling within the boiling temperature range of another component and a bottom product, withdrawing a portion of the distillation mixture from an intermediate point of said zone, distilling the withdrawn mixture into several side products, and returning one of said side products to the fractionating zone.

15. The process according to claim 14, in which an additional quantity of a separating agent is added to the withdrawn mixture prior to distillation.

16. A process for separating a mixture containing a plurality of components, each of said components containing a plurality of substances having different boiling temperatures, and at least some of the members of each component boiling within the boiling temperature range of the other components, comprising the steps of distilling said mixture in a fractionating zone in the presence of a separating agent of the type of a preferential solvent for the members of a first of said components, under conditions to produce a top product consisting of the separating agent and a concentrate of the lowest boiling members of one of said other components boiling within the boiling temperature range of another component, and a bottom product, withdrawing a portion of the distillation mixture from an intermediate point in said zone as a side stream, removing the separating agent from the side stream, distilling the residual portion of the side stream into a number of side products, and returning one of said side products to the fractionating zone.

17. A process for separating a hydrocarbon mixture containing at least a first and a second hydrocarbon component, each of said hydrocarbon components containing a plurality of hydrocarbons having different boiling temperatures, and the first hydrocarbon component containing hydrocarbons boiling within the boiling temperature range of the second hydrocarbon component, comprising the steps of distilling said mixture in the presence of a preferential solvent for the members of the second hydrocarbon component under conditions to produce a first top product containing a concentrate of the lowest boiling members of the first hydrocarbon component boiling within the boiling temperature range of the second hydrocarbon component, and a first bottom product, distilling the first bottom product substantially in the absence of the preferential solvent to produce a second top product containing a concentrate of the lowest boiling members of the second hydrocarbon component contained in said first bottom product, and a second bottom product, and distilling the second bottom product in the presence of a preferential solvent for the members of the second hydrocarbon component under conditons to produce a third top product containing a concentrate of members of the first hydrocarbon component, and a third bottom product.

18. A process for separating a hydrocarbon mixture containing at least a first and a second hydrocarbon component, each of said hydrocarbon components containing a plurality of hydrocarbons having different boiling temperatures, and the first hydrocarbon component containing hydrocarbons boiling within the boiling temperature range of the second hydrocarbon component, comprising the steps of distilling said mixture in the presence of a separating agent of the type of a preferential solvent for the members of the second hydrocarbon component under conditions to produce a first top product consisting of the separating agent and a concentrate of the lowest boiling members of the first hydrocarbon component boiling within the boiling temperature range of the second hydrocarbon component, and a first bottom product, and distilling the first bottom product substantially in the absence of the separating agent to produce a second top product containing a concentrate of the lowest boiling members of the second hydrocarbon component contained in said first bottom product, and a second bottom product.

19. A process for separating a sulfur-containing hydrocarbon mixture containing at least a first and a second hydrocarbon component and a sulfur component, each of said hydrocarbon components containing a plurality of hydrocarbons having different boiling temperatures, and the first hydrocarbon component containing hydrocarbons boiling within the boiling temperature range of the second hydrocarbon component, comprising the steps of distilling said mixture in a fractionating zone in the presence of a separating agent of the type of a preferential solvent having greatest solvent attraction for the sulfur component and an intermediate solvent attraction for the second hydrocarbon component under conditions to produce a first top product containing the separating agent and hydrocarbons of substantially reduced sulfur content and a first bottom product containing a concentrate of the sulfur component, removing the separating agent from the first top product, and distilling said first top product substantially in the absence of the separating agent to produce second top and bottom products, the latter containing a concentrate of the highest boiling hydrocarbons of the first hydrocarbon component contained in said first top product.

20. A process for separating a sulfur-containing hydrocarbon mixture containing at least a first and a second hydrocarbon component and a sulfur component, each of said hydrocarbon components containing a plurality of hydrocarbons having different boiling temperatures, and the first hydrocarbon component containing hydrocarbons boiling within the boiling temperature range of the second hydrocarbon component, comprising the steps of distilling said mixture in a fractionating zone in the presence of a separating agent of the type of a preferential solvent having greatest solvent attraction for the sulfur component, and an intermediate solvent attraction for the second hydrocarbon component under conditions to produce a first top product containing a concentrate of the lowest boiling members of the first hydrocarbon component boiling within the boiling temperature range of the second hydrocarbon component, and a first bottom product containing a concentrate of the sulfur compounds, withdrawing a portion of the distillation mixture from an intermediate point in the fractionation zone as a side stream, distilling the withdrawn side stream into at least two intermediate products, returning one of said intermediate products to the distillation zone, distilling the other of said intermediate products substantially in the absence of the separating agent to produce a second top product containing a concentrate of the lowest boiling members of the second hydrocarbon component, and a second bottom product.

21. A process for separating a sulfur-containing hydrocarbon mixture containing at least a first and a second hydrocarbon component and a sulfur component, each of said hydrocarbon components containing a plurality of hydrocarbons having different boiling temperatures, and the first hydrocarbon component containing hydrocarbons boiling within the boiling temperature range of the second hydrocarbon component, comprising the steps of distilling said mixture in a fractionating zone in the presence of a separating agent of the type of a preferential solvent having greatest solvent attraction for the sulfur components, and an intermediate solvent attraction for the second hydrocarbon component under conditions to produce a first top product consisting of the separating agent and a concentrate of the lowest boiling members of the first hydrocarbon component boiling within the boiling temperature range of the second hydrocarbon component, and a first bottom product containing a concentrate of the sulfur compounds, withdrawing a portion of the distillation mixture from an intermediate point in the fractionation zone as a side stream, distilling the withdrawn side stream substantially in the absence of the separating agent to produce a second top product containing a concentrate of the lowest boiling members of the second hydrocarbon component, and a second bottom product.

22. A process for separating a mixture containing a first and a second component, each of said components containing a plurality of substances having different boiling temperatures, and the first component containing substances boiling within the boiling temperature range of the second component, comprising topping said mixture in a series of distilling operations, the first distilling operation and alternate distilling operations thereafter being carried out in the presence of a separating agent of the type of preferential solvent for the members of the second component, and other distilling operations being carried out substantially in the absence of a separating agent.

23. In a process for separating a mixture of several components boiling throughout substantially the same boiling range and having different solubilities with regard to a preferential solvent for some of the components, the steps of distilling said mixture in a distillation zone in the presence of a separating agent of the type of the preferential solvent under conditions to produce a top product consisting of the agent and a concentrate of the lowest members of the component least soluble in the solvent and a bottom product consisting essentially of the concentrate of the components most soluble in the solvent, withdrawing from an intermediate point of the distillation zone a side stream having the concentration of said most soluble components substantially below that of the original mixture and substantially free of the said lowest members of the least soluble component, removing the separating agent from the withdrawn side stream, subjecting the residual portion of the side stream to fractional distillation in the absence of the separating agent to produce a top product consisting substantially of the lowest members of the components having an intermediate solubility in the solvent and a second bottom product, and separately withdrawing the two top and two bottom products from the process.

24. A process for separating a normally liquid hydrocarbon fraction of a wide boiling temperature range obtained by distilling a petroleum oil and containing paraffinic and non-paraffinic hydrocarbons, comprising the steps of distilling said mixture in the presence of a preferential solvent for non-paraffinic hydrocarbons under conditions to produce a first top product containing said solvent and a concentrate of the lowest boiling paraffinic hydrocarbons boiling within the boiling temperature range of the non-paraffinic hydrocarbons, and a first bottom product, distilling the first bottom product substantially in the absence of a preferential solvent to produce a second top product containing a concentrate of the lowest boiling non-paraffinic hydrocarbons contained in said first top product, and a second bottom product, and distilling the second bottom product in the presence of a preferential solvent for non-paraffinic hydrocarbons under conditions to produce a third top product containing a concentrate of paraffinic hydrocarbons and a third bottom product containing non-paraffinic hydrocarbons.

25. A process for separating a normally liquid hydrocarbon fraction of a wide boiling temperature range obtained by distilling a petroleum oil and containing paraffinic and non-paraffinic hydrocarbons, comprising the steps of distilling said mixture in the presence of a preferential solvent for non-paraffinic hydrocarbons under conditions to produce a first top product containing said solvent and both paraffinic and non-paraffinic hydrocarbons and a first bottom product containing a concentrate of the highest boiling non-paraffinic hydrocarbons, removing the preferential solvent from the first top product, distilling the first top product substantially in the absence of a preferential solvent to produce a second bottom product containing a concentrate of the highest boiling paraffinic hydrocarbons contained in said first top product, and a second top product, and distilling the second top product in the presence of a preferential solvent for non-paraffinic hydrocarbons under conditions to produce a third top product containing a concentrate of paraffinic hydrocarbons and a third bottom product containing non-paraffinic hydrocarbons.

PETRUS JURJEN ROELFSEMA.